United States Patent
Hearn et al.

(10) Patent No.: US 8,821,089 B2
(45) Date of Patent: Sep. 2, 2014

(54) ANCHORAGE SYSTEMS AND DEVICES

(75) Inventors: Gary Alexander Hearn, Yeovil (GB); Stephen Johnston-Hyde, Beaminster (GB)

(73) Assignee: C.N. Unwin Limited, Somerset (GB)

( * ) Notice: Subject to any disclaimer, the term of this patent is extended or adjusted under 35 U.S.C. 154(b) by 461 days.

(21) Appl. No.: 13/010,182

(22) Filed: Jan. 20, 2011

(65) Prior Publication Data

US 2011/0225773 A1 Sep. 22, 2011

(30) Foreign Application Priority Data

Jan. 20, 2010 (GB) .................................. 1000907.4

(51) Int. Cl.
*B60P 7/08* (2006.01)

(52) U.S. Cl.
USPC .......................................................... 410/105

(58) Field of Classification Search
USPC ......... 410/104, 105, 106, 116, 80; 244/118.1, 244/118.6, 137.1; 248/503.1
See application file for complete search history.

(56) References Cited

U.S. PATENT DOCUMENTS

| | | | |
|---|---|---|---|
| 4,026,218 A | 5/1977 | Prete, Jr. et al. | |
| 4,062,298 A | 12/1977 | Weik | |
| 4,449,875 A | 5/1984 | Brunelle | |
| 5,489,172 A | 2/1996 | Michler | |
| 5,823,724 A * | 10/1998 | Lee | 410/104 |
| 5,823,727 A * | 10/1998 | Lee | |
| 6,299,230 B1 | 10/2001 | Oettl | |
| 6,902,365 B1 | 6/2005 | Dowty | |
| 2007/0065248 A1 | 3/2007 | Legeay | |

FOREIGN PATENT DOCUMENTS

| | | |
|---|---|---|
| DE | 29712180 U1 | 9/1997 |
| DE | 29902465 U1 | 6/1999 |
| DE | 202005013714 U1 | 12/2005 |
| EP | 0581072 A1 | 2/1994 |
| EP | 1892142 A1 | 2/2008 |
| EP | 2206623 A1 | 7/2010 |
| FR | 2912993 A1 | 8/2008 |
| GB | 2219493 A | 12/1989 |
| GB | 2315013 A | 1/1998 |
| GB | 2406877 B1 | 4/2005 |
| WO | 2010107343 A1 | 9/2010 |
| WO | 2011005600 A1 | 1/2011 |

OTHER PUBLICATIONS

United Kingdom Search Report, Dated May 10, 2011, in Application No. GB 1000908.2.

(Continued)

*Primary Examiner* — Stephen Gordon
(74) *Attorney, Agent, or Firm* — Young & Thompson

(57) ABSTRACT

Anchorage device for an anchorage system, especially for vehicle seats, using a floor track having a longitudinal channel whose opening has opposed lips with a series of periodic circular cut-outs, the anchorage device has enlarged slidable feet which are insertable into the opening of the track channel at the cut-outs, and when slid along are held captive beneath the lips of the track. A releasable locking mechanism is provided for locking the device longitudinally to the track, so that the feet can be held in the captive position. Preferably, the device has an elongate body, with the locking mechanism operated by a lever at one end. The top surfaces of at least some of the feet are longitudinally inclined relative to the longitudinal direction. When slid to the captive position they come into contact or near contact with the underside of the track lips, reducing or preventing rattle relative to the track.

8 Claims, 4 Drawing Sheets

(56) References Cited

OTHER PUBLICATIONS

European Search Report, dated May 9, 2011, in Application No. EP 11250061.

European Search Report, dated May 9, 2011, in Application No. EP 11250062.

United Kingdom Search Report, dated Nov. 25, 2010, in GB1000907.4.

* cited by examiner

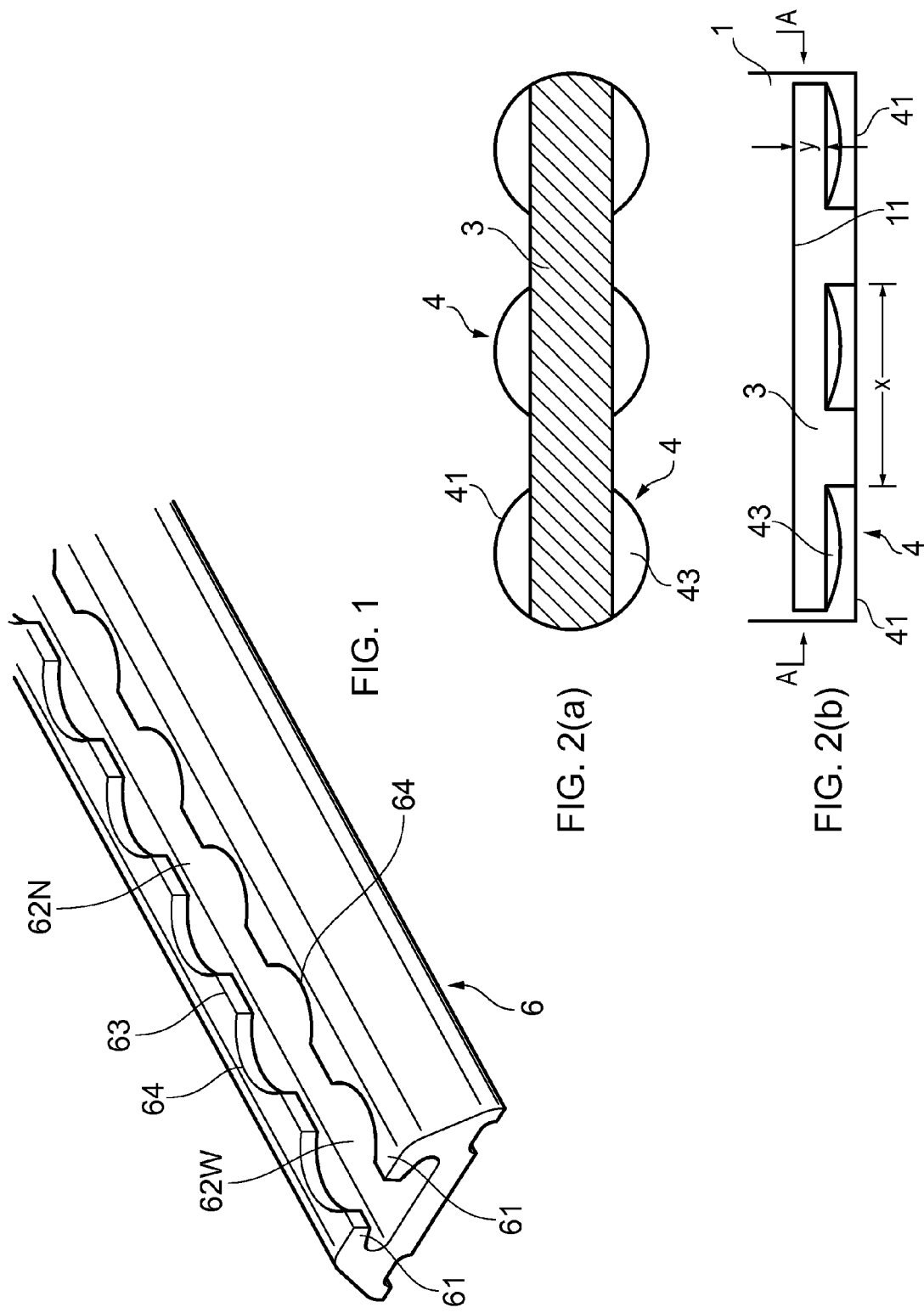

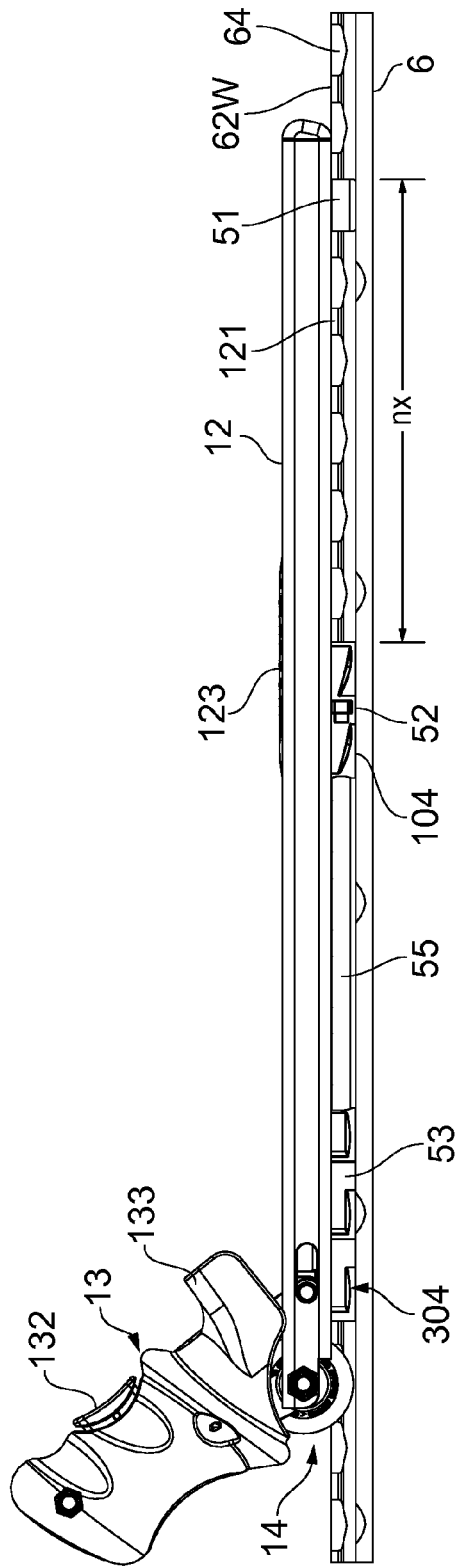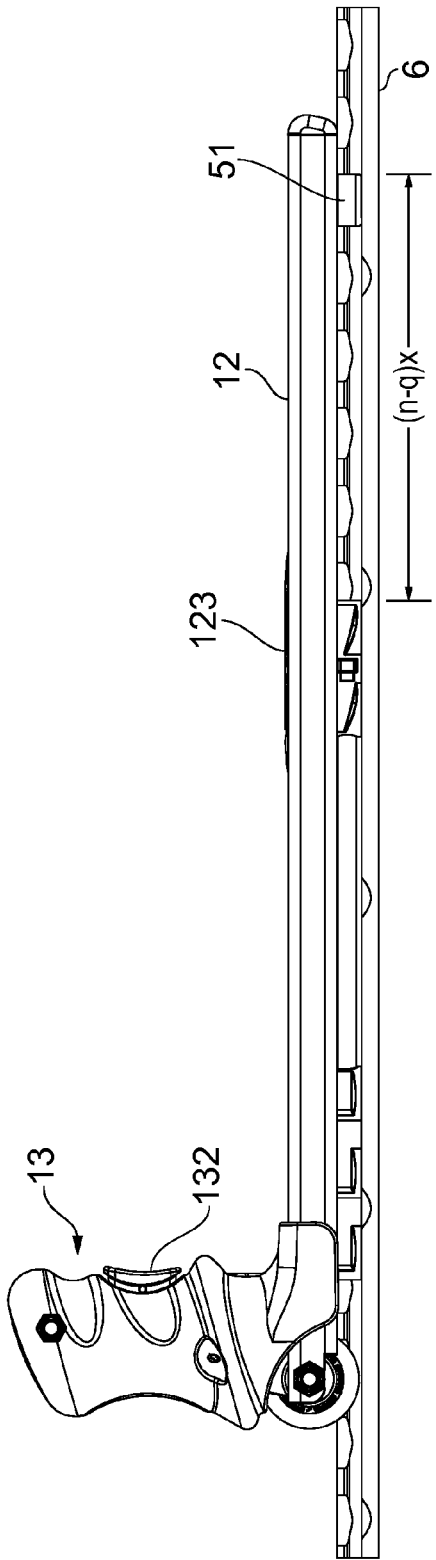

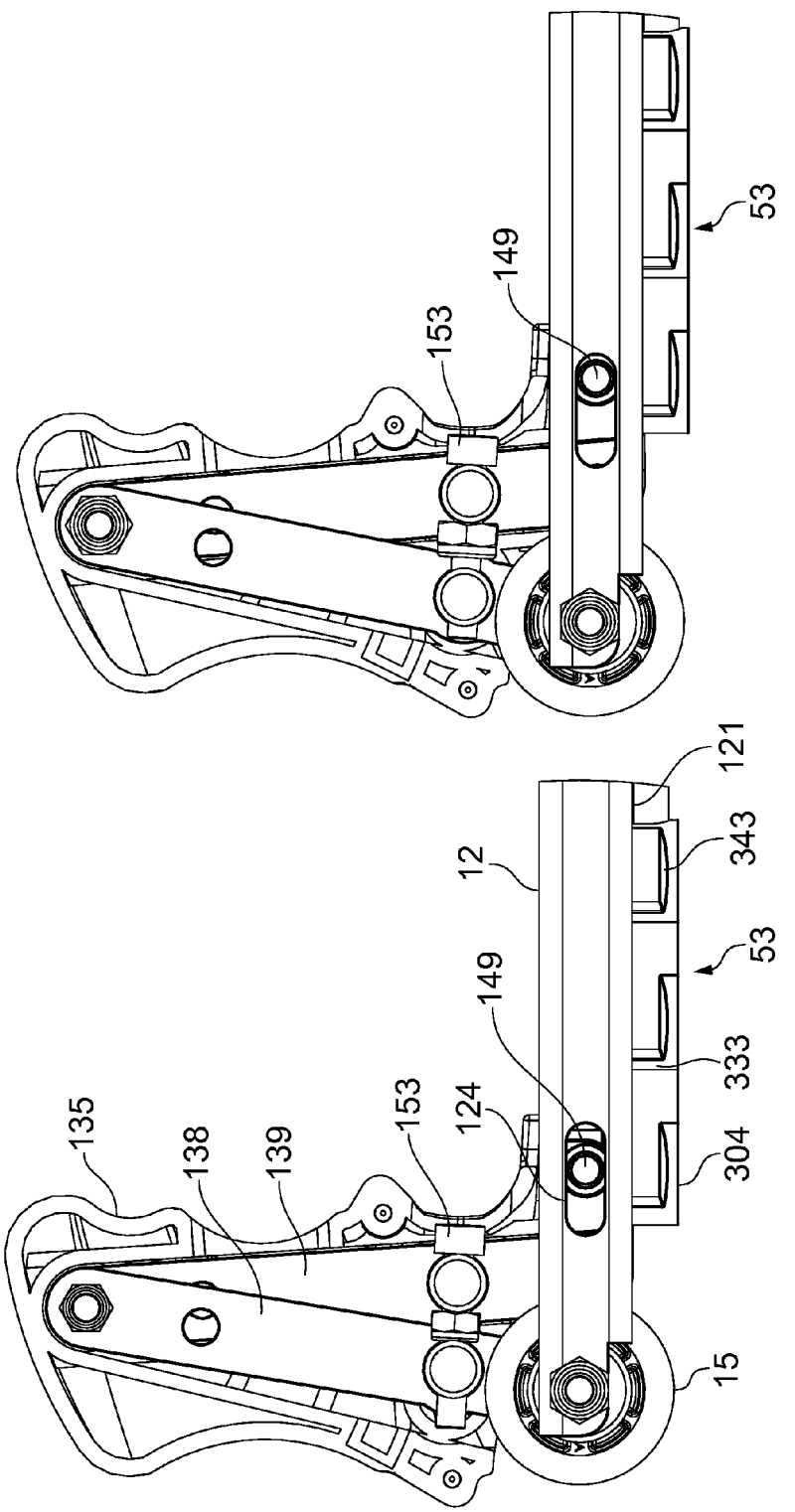

ANCHORAGE SYSTEMS AND DEVICES

FIELD OF THE INVENTION

This invention has to do with systems for anchoring articles by means of track or rail formations. It has particular application for anchoring objects in vehicles, such as vehicle furniture e.g. seats, and restraints such as straps and the like.

BACKGROUND

It is well known to adapt the floors of vehicles (such as vans, minibuses and coaches) for the securing of furniture, seating, wheelchairs or other objects at any of a range of locations with variable position according to need. Typically this is by one or more tracks fixed onto or integrated into the vehicle floor. The tracks have an upwardly-open internal channel, usually formed using extruded aluminum, and the top opening of the channel—extending the length of the track—is defined between opposed overhanging lips or flanges.

The most popular track format (seen in FIG. 1) is "scalloped" track 6 in which the channel opening 62 is interrupted by a series of periodic enlargements, usually of a circular outline. Each lip or flange 61 has a regular series of cut-outs 64 opposed to corresponding cut-outs 64 on the opposite lip 61. Opposed cut-out pairs constitute wide parts 62W or enlargements of the track opening. Opposed straight lip edges 63 between cut-outs provide narrow parts 62N of the track opening.

Anchorage devices usable with such track have one or more slidable foot portions with a laterally-enlarged bottom part dimensioned to be insertable into the track at a wide part but which when slid along about half a track cut-out period spacing (half a step) is held captive beneath the lips at the narrower part. An intermediate-height foot part, above the lateral bottom part, is narrower so that it can slide along into the narrow track part. One or more such slidable feet anchor the device against being pulled up away from the track.

It is necessary in some manner to lock the device longitudinally in position relative to the track so that the slidable foot cannot slide from the captive position to a removal/insertion position aligned with a track cut-out. Accordingly it is usual for an anchorage device additionally to have one or more non-slidable protrusions, dimensioned to project into a cut-out but unable to slide through the narrow parts. Such non-slidable protrusion(s) may transfer operational longitudinal loads from the anchorage device to the track as well as holding the slidable foot portion(s) in the captive position.

To be able to engage/disengage both slidable feet and non-slidable protrusions with a track, the anchorage device must provide for some relative movement between them. One conventional way is by forming a non-slidable protrusion as a "plunger", positioned about half a step out relative to the slidable foot portion(s) and movable in the device towards and away from the track so that it can be lowered into a track cut-out after the slidable foot portion has been inserted into the track and slid to the captive position. Alternatively it is known to provide a mechanism in the device to shift a slidable foot portion and a non-slidable protrusion longitudinally relative to one another in the device, changing their spacing from being in step (and thereby insertable/removable together in relation to the track) to being substantially half a step out of step (and thereby held captive).

These rail fixing systems are widely used because of their versatility and ease of use. Fixtures do not need to be slid into the track from the end, but can be inserted into it at any point along its length. One particular use of current importance is in the securing of seats, wheelchairs or related or other fittings in vehicles e.g. vehicles designed for use by elderly and/or disabled people. For example, wheelchairs are conventionally secured by a set of four restraining straps, one at each corner secured by respective anchorages to a pair of parallel floor tracks at either side of the wheelchair. Each anchorage may be attached to a simple belt or strap with a clip, karabiner or buckle, adjustable belt, retractable and/or tensionable belt on a reel or any other suitable device or fitting. Or, the two sides of a seat may be rigidly secured down to securement means provided on an anchorage device at either side of the seat, to engage a respective track. Alternatively such anchorage devices may be incorporated into a seat base or leg structure.

It is known to provide means for avoiding or reducing play or "rattle" between a device of the kind described and the track to which it is fixed. In general a tight fit of the feet in the track channel is avoided because it makes the devices hard to insert and slide into position. Also the dimensions of different tracks—the channel depth, width, and the metal thickness at the lips—can vary and this must be accommodated. Accordingly some known anchorage devices—particularly those used for rigid seat fixtures where play, shifting and rattling are especially undesirable—incorporate mechanisms for clamping or gripping against the track in the captive position. See for example GB-A-2219493 and GB-A-2315013. However such mechanisms tend to be complex in structure e.g. requiring a tall construction, or central access to a long-form anchor, or are awkward to operate, or are incompatible with systems using insertable feet in scalloped track.

THE INVENTION

One preferred object herein is to provide anchorages with novel means for reducing play or "rattle".

What we propose is that, in an anchorage device of the kind described having an anchoring formation comprising at least one slidable foot portion, an upwardly-directed surface of at least one said slidable foot portion—being a top surface of the lateral enlargement, which in the captive position of the device will be opposed to the underside of a track lip at the narrow part—is longitudinally inclined relative to the longitudinal direction of the device. That is, in use in relation to a track taken as horizontal, the upwardly-directed surface is inclined non-horizontally in the longitudinal direction. Usually the anchorage device has a body with a downwardly-directed surface or undersurface, and the vertical clearance between this undersurface and the inclined upwardly-directed foot surface converges longitudinally.

Preferably the upwardly-directed foot surface is longitudinally inclined in the same direction over at least 50%, more preferably at least 70% or 80% and most preferably over substantially all of its longitudinal length. The angle of longitudinal inclination relative to the horizontal ("horizontal" being as understood from the above) is preferably at least 5°, more preferably at least 10°. It is usually less than 25°, more preferably less than 20°. It may steepen from the lower end ("front end") to the higher end.

Desirably such longitudinally-inclined upwardly-directed foot surface is present on more than one foot portion and/or on both left and right sides of a foot portion. Desirably it has the same inclination conformation on all foot portion surfaces on which it is present.

The purpose of this feature is that as the foot portion is slid along a track from the insertion position to the captive position, the or each inclined upwardly-directed foot surface will at some stage of the movement come into compressive contact (or near-contact) with the underside of the corresponding track lip (flange). When this contact or near-contact is made, an anti-rattle, play-reducing or play-eliminating effect is achieved directly, without a supplementary clamping operation being needed. Therefore the device does not need and preferably does not have any play-eliminating mechanism of the type which moves one or more foot portions vertically or laterally in relation to a body of the device, to clamp the track flange or expand in the track channel. A longitudinal movement may be enough.

In preferred embodiments the foot portion has a circular or part-circular outline, e.g. to fit conventional "scalloped" track. Plural feet may be on discrete respective intermediate-height stems. More preferably they are formed as longitudinally-local lateral projections at the bottom of a central keel formation which is at the intermediate height and can fit between the track flanges. The mentioned top surfaces need not be inclined laterally, but in some embodiments a slight outward lateral down-slope may assist conformity with the underside of the track flange (and is known per se).

The extent of longitudinal movement required for contact will depend to some extent on the dimensions and relative dimensions including the thickness of the track flange and the angle of the foot surface longitudinal incline. As mentioned, the anchorage device should comprise releasable means, especially manually operable, for locking the longitudinal position of the device relative to the track and/or transferring longitudinal loads in the captive position. This may be a non-sliding protrusion operable as a plunger, or a non-sliding protrusion relative to which the sloping-topped foot portion (s) of the present proposal is/are longitudinally movable in the device, e.g. drivable by a mechanism comprised in the device, between an insertion/removal spacing and a locked captive spacing.

It is also possible to provide a fine adjustment mechanism whereby a longitudinal difference, preferably a preset difference, between these two spacings can be adjusted to control the exact longitudinal foot position in the locked captive state and thereby optimise contact of the inclined foot top surface (s) against the underside of the track flange. For this reason it is usually preferred to use a non-sliding protrusion relative to which the inclined-top foot portion(s) of the present proposal is/are longitudinally movable in the device, because such mechanisms are more easily adapted to include a longitudinal spacing fine adjustment. However the present characteristic sloping-topped feet may be semi-slidable i.e. unable to slide further after contacting the track flange underside, and able to escape to a removal position only in the return direction. This indicates a further alternative embodiment for locking by having plural sloping-topped feet—e.g. in two sets thereof— movable longitudinally relative to one another between an insertion/removal spacing and a locked captive spacing, and with their slopes oppositely directed. An ordinary non-slidable protrusion is then optional because one set constitutes releasable locking means in relation to the other. A fine adjustment mechanism for the spacing is still desirable.

The anchorage device may also comprise one or more other slidable feet without such longitudinally-inclined top surface. These may be at an unchanging longitudinal position relative to the sloping-topped feet, e.g. slidable in unison with the sloping-topped feet relative to a fixed non-slidable protrusion.

Where a relative longitudinal movement is provided as mentioned above, the device preferably comprises a drive mechanism for driving movement at least in the sense from the insertion/removal spacing to the locked captive spacing. The drive mechanism may be non-reversible in that sense, to prevent accidental release. For example it may automatically lock at the captive position, e.g. by an over-center mechanism, and/or by tripping a sprung locking pin, and then require a separate release operation (e.g. by manually actuating a release control) to allow return to the insertion/removal state. Or, in or as in a screw thread drive, it may have a much larger mechanical advantage in one direction than in the other.

One preferred embodiment of the anchorage device, suitable e.g. as a seat securement, has an elongate body with a non-slidable protrusion adjacent one end for longitudinal location, one or more sloping-topped feet at an intermediate position to prevent rattling and one or more non-sloping-topped feet adjacent the other end for resistance to pulling out of the track. A drive mechanism may move both the one or more sloping-topped feet and the one or more non-sloping-topped slidable feet together relative to the non-slidable protrusion. Desirably a single actuating member, preferably at or adjacent one end of the device, operates the drive mechanism. Desirably it is a manually-actuable mechanism. Preferably the non-slidable protrusion is fixed relative to the main body or chassis of the device. The device body may constitute a seat portion, e.g. a leg part or support, or may have engagement means such as bolt holes or sockets on its upper side for fixing such components to it.

Aspects of the invention include anchorage devices of the kind described, anchorage systems including an anchorage device and one or more corresponding tracks, a vehicle comprising such a system, and articles comprising such anchorage devices whether integrally or as an attachment. Preferred embodiments include seats, seat anchorages and restraint straps. Further aspects include methods of securing or restraining objects in vehicles, especially to vehicle floors, especially seating, using anchorage systems and anchorage devices as described. One or more of the anchorage devices may be secured to the track and then to an object to be restrained, or vice versa, or the object to be restrained may integrally comprise one or more of the anchorage devices which is/are secured to the track.

BRIEF DESCRIPTION OF THE DRAWINGS

Embodiments of the invention are now described by way of example, including the best mode known to the inventors, with reference to the accompanying drawings in which:

FIG. 1 is a perspective view of a typical track (already described above);

FIGS. 2(a),(b) show a conventional anchorage formation or set of feet usable with the FIG. 1 track, FIG. 2(b) being a side view of the anchorage formation and FIG. 2(a) being a horizontal section at A-A showing the feet from above;

FIG. 5 shows an anchorage device embodying the invention resting on a track in an insertion/removal position, the track being shown in vertical median section;

FIG. 6 shows the anchorage device of FIG. 5 actuated to bring it to the captive state relative to the track;

FIGS. 7 and 8 are enlarged views of the actuator handle of the anchorage device showing different conditions of a fine adjustment mechanism.

DETAILED DESCRIPTION OF THE PREFERRED EMBODIMENTS

Figure 3A:
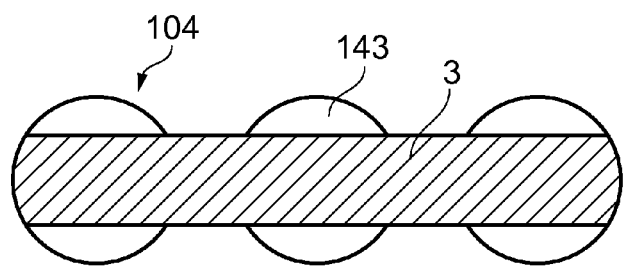
FIGS. 3(a), (b) are views corresponding to FIGS. 2(a), (b) but showing a set of feet or anchorage formation which is a first embodiment of the invention.

The conventional anchorage formation shown in FIG. 2 comprises three feet (or pairs of feet) 4 projecting out laterally to either side of a central keel formation 3. FIG. 2(b) also shows a top body portion 1 which enlarges laterally above the keel 3, presenting a downwardly-directed surface 11 which in use rests on top of the track flanges 61. The anchorage formation has a flat bottom surface 41 common to the keel 3 and feet 4. The width of the keel 3 is always less than the width of the narrow parts 62N of the track channel, so that once the feet 4 have been dropped down through the cut-outs 64 forming the wide parts 62W, the formation can move freely along the track. Each foot 4 has a circular plan shape fitting easily through the circular-plan cut-outs 64 of the track, and provided by lateral projections with circularly-arcuate edges 41 from the side of the keel formation 3. Usually the top surfaces 43 of the feet 4 incline slightly outwardly and downwardly as shown, to match a corresponding slight lateral convergence at the edges of the inverted-T channel profile of the track 6. The feet projections 4 are a loose fit in the channel track, and the vertical clearance y (see FIG. 2(b)) between the top surface 43 of each foot and the downward surface 11 of the body 1 is greater than the track flange thickness so that, as is well known, even with the formation moved to a captive position (the feet aligned with the narrow parts of the track channel) it can still shift slightly vertically, laterally and rotationally unless special measures are taken to prevent this.

Figure 3B:
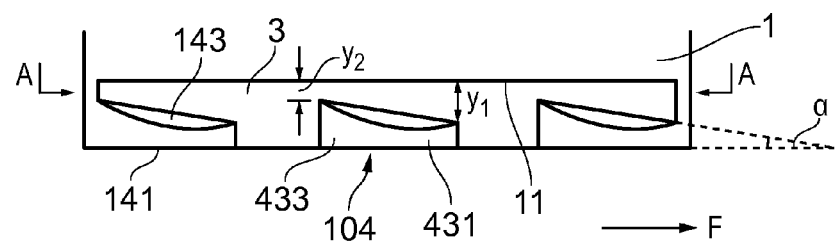
Figure 4A:
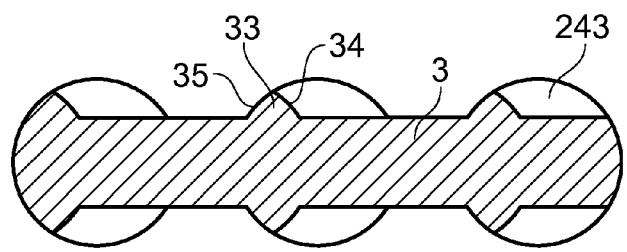
FIGS. 4(a), (b) are corresponding views of a further anchorage formation or set of feet which is a second embodiment of the invention.
Figure 4B:
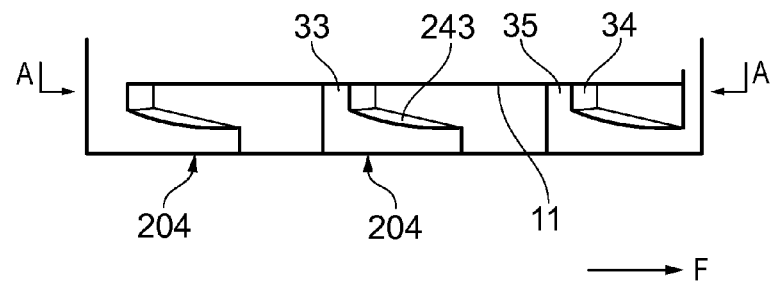

FIG. 2 shows an anchorage formation, not a complete anchoring device. As is well known, such a device may have an anchoring formation and a body 1 carrying a plunger positioned half a step (0.5 x) out relative to the feet so that it can be lowered non-slidably into a cut-out 64 region of the track to hold the device in the captive position. Or, an anchorage formation as shown may be one of plural anchoring formations on the underside of an anchorage device. The anchorage formation with slidable feet may be fixed, or longitudinally moveable in the device, as discussed previously. FIGS. 2 to 4 are presented to show the features of the foot projections rather than details of anchorage devices comprising them.

FIG. 3 shows a formation embodying our new proposals. In the conventional formation of FIG. 2, the top foot surfaces 43 were longitudinally horizontal. In FIG. 3 the corresponding feet 104 have the same circular outline and flat undersurface 141, but their top surfaces 143 are inclined longitudinally, as indicated by the angle α at the right-hand side of the figure. This angle is preferably between 10 and 20°, e.g. about 15°. As before, the upper surfaces 143 also slope down laterally. All of the feet 104 on both sides have the same top surface inclination, in the same direction. The formation thus becomes directional, with a forward direction indicated "F" in FIG. 3. Each foot accordingly has a low end 431 and a high end 433, with the clearance $y_1$ between the foot surface 143 at the low end 431 and the body undersurface 11 being substantially larger than the clearance $y_2$ at the high end 433. The absolute distance and relative difference depends on the dimensions and shapes of the track and feet, but usually $y_1$ is at least 1.5 and preferably at least 2 times $y_2$.

The sloping top surfaces 143 slope at a generally constant angle from the low end to the high end. In this embodiment the slope continues all the way to the high (rear) end of each foot.

In use, the formation is inserted in the track in the usual way. The dimensions are selected so that clearance $y_2$ at the rear ends of the feet is slightly less than the track flange or lip thickness adjacent the cut-outs 64. The formation must therefore be slid forwardly (in the direction of F), the low ends 431 of the feet initially easily passing under the flange with large clearance, and the clearance then decreasing until the convergence between the foot top surfaces 143 and the horizontal undersurface 11 of the body 1 clamps the track flanges adjacent the respective cut-outs and the formation will slide no further. Importantly, in this condition the formation is clamped and does not rattle or shift in the track. Provided that the corresponding anchorage device provides some means for maintaining it in this longitudinal position, an anti-rattle feature is therefore achieved without any separate mechanism being required.

FIG. 4 shows a variant in which fixed intermediate-height abutments are provided in the slidable formations, according to the proposals in our EP-A-2206623 and GB-A-2466801, the entire disclosure of which is hereby incorporated herein by reference. The inclined top surface 243 of the foot 204 does not continue all the way to the back. At the intermediate height region between the foot surface 243 and the body undersurface 11, but within the plan circular shape envelope of the foot, the formation has a fixed lateral projection 33 with front and rear arcuate shoulder surfaces 34,35 corresponding generally to the arc curvature of the track cut-outs 64. In the embodiment shown, each foot has a pair of these shoulder abutments, one to each side.

When slid forward from the insertion position, the convergence between the inclined foot surface 243 and the body under surface 11 can lead to a clamping anti-rattle engagement with the track flange. Additionally, provided that the track flange thickness is well matched to the dimensions of the anchorage formation, the forward abutment shoulder faces 34 meet or approach close to the arcuate edges of the track flange cut-outs 64. Thus, movement necessarily stops before the circular foot outline lies entirely beneath the narrow track portion 62N, but the presence of the fixed intermediate-height shoulder abutments provides substantial longitudinal load-bearing capacity. Of course, for effective anti-rattle clamping it is preferred that the convergent surface grips or presses against the underside of the flange so it may be that the abutment shoulders 34 stop slightly short of the flange shoulders. However, they still provide additional longitudinal strength.

As explained previously, formations as in FIGS. 3 and 4 constitute only part of an anchorage device. The device needs at least one counter-formation by means of which the sloping-topped feet are held in their clamped engagement with the track. A range of possibilities for this was discussed above in the introduction, as was the desirability of a facility for fine longitudinal adjustment of the locked position relative to the track so that the anchorage can be used over a range of track flange thickness.

The skilled person will appreciate that not all the feet need to be the same. For example the fixed shoulder abutments can be effective in any number. Usually the longitudinally inclined top surface conformations are provided on all feet in a set, to maximise grip, although in principle feet in the set lacking such a conformation will still provide security against pulling out of the track, so at the limit even a single foot with the sloping top surface will have a useful effect. Moreover the number of feet in a set is freely variable according to requirements. They need not all be spaced at single period spacings x. Also, the skilled person is aware that the keel type intermediate structure is only one preferred possibility and a series of longitudinally-spaced individual keels or central foot stems (mushroom form) is also possible.

FIGS. 5 to 8 show an anchorage device embodying these proposals.

The device consists generally of a rigid elongate chassis or body 12 with a generally flat horizontal undersurface 121. Projecting down from the front end of the device is a single rigid and fixedly-mounted locating boss 51, substantially cylindrical in shape and able to fit closely and non-slidably into a wide portion 62W of the track: this engagement serves as an initial locator and reaction point when fitting the device.

The rear half of the chassis 12 houses a longitudinally-slidable carriage 55 which at its front end (adjacent the longitudinal center of the device) carries a set 52 of anchoring formations 104 in accordance with the invention, substantially of the shape seen in FIG. 3. At its rear end, adjacent the rear end of the device chassis 12, the carriage 55 has a set of feet 304 with longitudinally-horizontal top surfaces 343, i.e. not embodying the present proposal, although they are provided with intermediate-height fixed abutment portions 333 similar to those shown as an option in FIG. 4. The carriage 55 is mounted slidably in an internal longitudinal cavity of the chassis 12 and is very strongly held within it. The top of the chassis 12 has one or more securing formations 123, not shown in detail, which may be of any kind suitable for attaching articles such as seating to be held on the track 6 e.g. bolts, threaded holes, eyes or the like.

At the rear end of the chassis 12 an operating lever 13 is pivotally mounted for movement between a release position (FIG. 5) and a locked position (FIG. 6). Operation of the lever or handle 13 slides the carriage 55 between the release condition (in which there is a whole number of period spacings "nx" between the front locating protrusion 51 and the moveable slidable protrusions 52,53) and the locked position in which (as indicated in FIG. 6) the difference is no longer an integral multiple of x but about half a step out. In the expression "(n−q)x", n is an integer, x is the periodic spacing and q is a fraction of about half, typically from 0.4 to 0.6 (according to the state of adjustment of the operating mechanism, discussed below). The operating handle 13 drives the carriage via an operating mechanism seen in more detail in FIGS. 7 and 8, where half of the handle casing 135 is removed to show pivoted drive link members 138,139, the rear link 138 being pivoted at the bottom coaxially with the handle itself and the front link 139 connecting, via a pivoted pusher link guided by a transverse pin 149 running in a guide slot 124 of the chassis side wall, to the carriage 55 which carries the foot formations 52,53.

The handle includes also a stop formation 133 which defines and limits the forward movement of the handle 13 by meeting the top of the chassis 12. In the forward position of the handle (FIG. 6) the drive mechanism reaches an over-center state and is stable against reverse operation; additionally or alternatively a separate lock mechanism with an exposed release button 132 on the front of the lever (and positioned in a recess of the casing 135 so that it is not accidentally released) engages to hold the captive state, and is releasable to allow the lever to be swung back, sliding the carriage 55 to the release position.

A fine adjustment mechanism 153 has a threaded adjuster which controls the limit angle between the drive links 138, 139 and thereby (as can be seen by comparing the positions of the guide pin 149 in FIGS. 7 and 8, which show the respective extremes of the adjustment) controls how far the carriage 55 is advanced when the lever 13 is swung to the locked forward position. This adjustment, which can be made through an opening in the casing of the lever 13, enables the advance of the carriage—and hence the degree of clamping achieved by the sloping-topped locking formations 52—to be suited to the dimensions of the track.

FIGS. 5 to 8 also show a rear support wheel 15 on the rear end of the chassis, co-axial with the control lever 13. This is to help support the device as it is moved into position and is in itself a known feature.

Considering the performance of the device as a whole, the anti-rattle function is provided near the middle of the elongate chassis 12, while the non-sloping slidable formations with the additional longitudinal abutment shoulder are provided adjacent the rear end. The rear end is the position where maximum vertical pull resistance (especially vertical) is needed in the event of an accident, hence the large number of feet at this position. The central part is where rattling is most likely to arise and therefore is most effectively eliminated by the positioning of the novel sloping foot formations. The front part provides longitudinal load-bearing in combination with the fixed abutments at the rear end. Usually it does not need to resist pulling out of the track, so this is a suitable place for a simple non-slidable protrusion.

The invention claimed is:

1. An anchorage device, defining a longitudinal axis, for use in an anchorage system with a track having an upwardly-open longitudinal channel with opposed overhanging lips having respective undersides and defining between them a top channel opening, the overhanging lips having a series of periodic cut-outs forming a series of wide parts of the top channel opening, with narrow parts of the top channel opening located between the wide parts, the anchorage device comprising:
 a body;
 one or more slidable foot portions beneath the body, the or each slidable foot portion comprising
  a laterally-enlarged bottom part dimensioned to be insertable into the top channel opening of the track channel only at the cut-outs thereof, and having an upwardly directed top surface, and
  an intermediate-height part above said bottom part and narrower than the bottom part so that the intermediate-height part is slideable within the narrow parts of the top channel opening,
 whereby, in use, the or each foot portion is insertable into the longitudinal channel of the track when the device is at a removal/insertion position relative thereto, with the or each slidable foot portion aligned with a said cut-out, whereas when the device is slid along the track to a captive position relative thereto, the bottom part of the or each foot portions is held captive beneath the overhanging lips of the track at a narrow part of the top channel opening with the upwardly-directed top surface opposed to the undersides of the overhanging lips; and
 a releasable locking mechanism for releasably locking the device longitudinally in position relative to the track in a locked condition in use, whereby in the locked condition, the slidable foot portion cannot slide from the captive position to the removal/insertion position,
 wherein the upwardly-directed top surface of at least one of said one or more slidable foot portions, which in the captive position is opposed to a respective one of the undersides of one of said overhanging lips of the track, is inclined upwardly towards the body relative to the longitudinal axis, in a same direction of inclination over at least 50% of the longitudinal length of said top surface, and
 wherein the locking mechanism comprises a protrusion insertable into the wide parts of the top channel opening of the track in use, and is operable to drive longitudinal movement between the foot portion having the upwardly-inclined top surface and said protrusion, to move the foot portion and the protrusion between an insertion/removal spacing corresponding to the removal/insertion position and a captive spacing corresponding to the captive position.

2. An anchorage device, defining a longitudinal axis, for use in an anchorage system with a track having an upwardly-open longitudinal channel with opposed overhanging lips having respective undersides and defining between them a top channel opening, the overhanging lips having a series of periodic cut-outs forming a series of wide parts of the top channel opening, with narrow parts of the top channel opening located between the wide parts, the anchorage device comprising:

an elongate body having a back end, a front end and a downwardly-directed undersurface;

a plurality of slidable foot portions distributed longitudinally beneath the body, each slidable foot portion comprising a laterally-enlarged bottom part dimensioned to be insertable into the top channel opening of the track channel only at a said cut-out thereof, and having an upwardly directed top surface, and an intermediate-height part, above said bottom part, which is narrower than the bottom part so that the intermediate-height part can slide in the narrow parts of the top channel opening, whereby, in use, the foot portions are insertable into the longitudinal channel of the track when the device is at a removal/insertion position relative thereto, with the foot portions aligned with said cut-outs, whereas when the device is slid along the track to a captive position relative thereto, the bottom parts of the foot portions are held captive beneath the overhanging lips of the track at narrow parts of the top channel opening with their upwardly-directed top surfaces opposed to the undersides of the overhanging lips, the upwardly-directed top surface of at least one of said slidable foot portions, which in the captive position of the anchorage device is opposed to at least one of the undersides of said overhanging lips of the track, being inclined upwardly towards the body relative to the longitudinal axis, so as to reduce or eliminate play between said foot portion and said opposed lip of the track in the captive position, one or more of said slidable foot portions having said upwardly-inclined top surface and being at an intermediate longitudinal position of the body, and one or more further said slidable foot portions being adjacent the back end of the elongate body and having respective top surfaces generally parallel to the longitudinal axis of the device;

a non-slidable downward protrusion at the front end of the body for insertion into a said wide part of the channel opening to lock the anchorage device longitudinally in position relative to the track in use;

a releasable locking mechanism for releasably locking the device in a locked condition in use, wherein a said slidable foot portion is prevented from sliding from the captive position to the removal/insertion position; and a drive mechanism operable to move both said one or more of said slidable foot portions having said upwardly-inclined top surface and said one or more further said slidable foot portions having generally parallel top surfaces together relative to the non-slidable protrusion.

3. The anchorage device according to claim 2, further comprising:

an actuating member for operating said drive mechanism, the actuating member being at an end of the body.

4. The anchorage device according to claim 3, wherein said actuating member is a lever mounted pivotably at the back end of the elongate body.

5. A vehicle seat system comprising one or more anchorage devices according to claim 1.

6. A vehicle seat system comprising one or more anchorage devices according to claim 2.

7. A method of securing seats in a vehicle having a floor with a track having an upwardly-open longitudinal channel with a top channel opening defined between opposed overhanging lips, the top channel opening having a series of periodic cut-outs, the method comprising:

securing a seat to the anchorage device according to claim 1 and securing the anchorage device to the track.

8. A method of securing seats in a vehicle having a floor with a track having an upwardly-open longitudinal channel with a top channel opening defined between opposed overhanging lips, the top channel opening having a series of periodic cut-outs, the method comprising:

securing a seat to the anchorage device according to claim 2 and securing the anchorage device to the track.

\* \* \* \* \*